(12) United States Patent
McNeely

(10) Patent No.: US 6,229,464 B1
(45) Date of Patent: May 8, 2001

(54) PULSE CODE MODULATED TO DC CENTERED VSB CONVERTER

(75) Inventor: David Lowell McNeely, Indianapolis, IN (US)

(73) Assignee: Thomson Licensing S.A., Boulogne Cedex (FR)

( * ) Notice: Subject to any disclaimer, the term of this patent is extended or adjusted under 35 U.S.C. 154(b) by 0 days.

(21) Appl. No.: 09/382,232

(22) Filed: Aug. 24, 1999

(51) Int. Cl.[7] .................................................. H03M 1/06
(52) U.S. Cl. ............................................................ 341/118
(58) Field of Search .................................... 341/118, 143, 341/126, 144; 375/25, 33, 34

(56) References Cited

U.S. PATENT DOCUMENTS

| | | | |
|---|---|---|---|
| 4,140,925 | * 2/1979 | Meyer | 341/118 |
| 5,287,106 | * 2/1994 | Senderowicz | 341/118 |
| 5,764,701 | 6/1998 | Horwitz | 375/301 |

OTHER PUBLICATIONS

Ray Hauge et al., *ATSC VSB Re–Modulator System,* IEEE Transactions on Consumer Electronics, vol. 44, No. 3, Aug., 1998, pp. 823–826.

\* cited by examiner

Primary Examiner—Brian Young
(74) Attorney, Agent, or Firm—Joseph S. Tripoli; Eric P. Herrmann; Ronald H. Kurdyla

(57) ABSTRACT

A digital VSB modulator includes a modulator to which an ongoing sampled data stream of 1-sample-per-symbol successive PCM symbol signal samples are applied as a modulating signal. A sampled carrier stream, occurring at the rate of the signal samples, is applied as a carrier input to the modulator. The carrier stream is composed of, for example, a repeated 4-sample-sequence of 1, −1, −1, 1 sample values. The output of the modulator is applied to a bifurcated multiplexed N-tap root Nyquist FIR filter, which produces a VSB bifurcated complex output signal having a DC-centered real (±R) sampled data output stream of 1-sample-per-symbol sample values and a DC-centered imaginary (±I) sampled data output stream of 1-sample-per-symbol sample values.

15 Claims, 9 Drawing Sheets

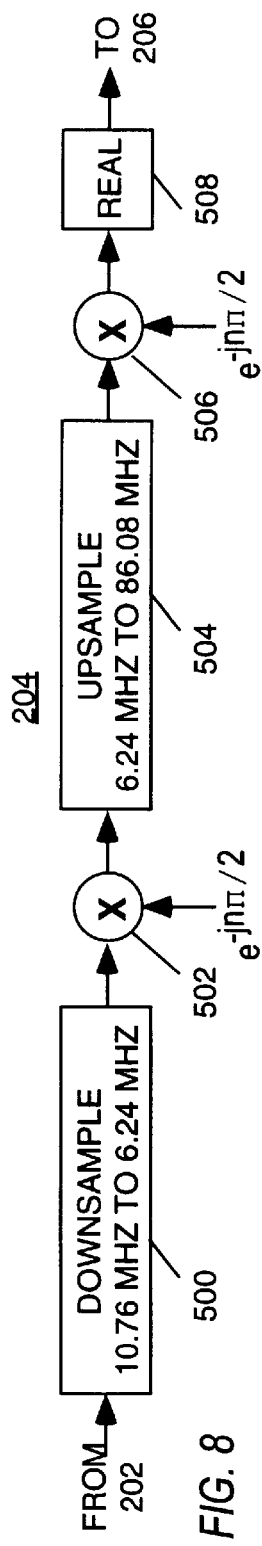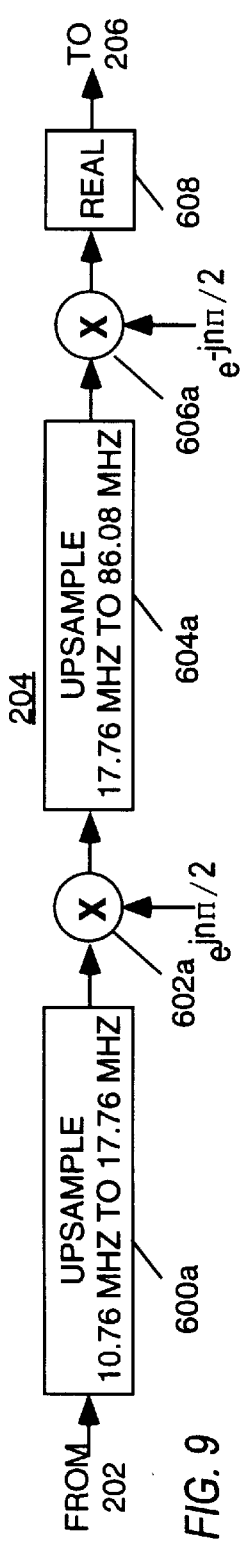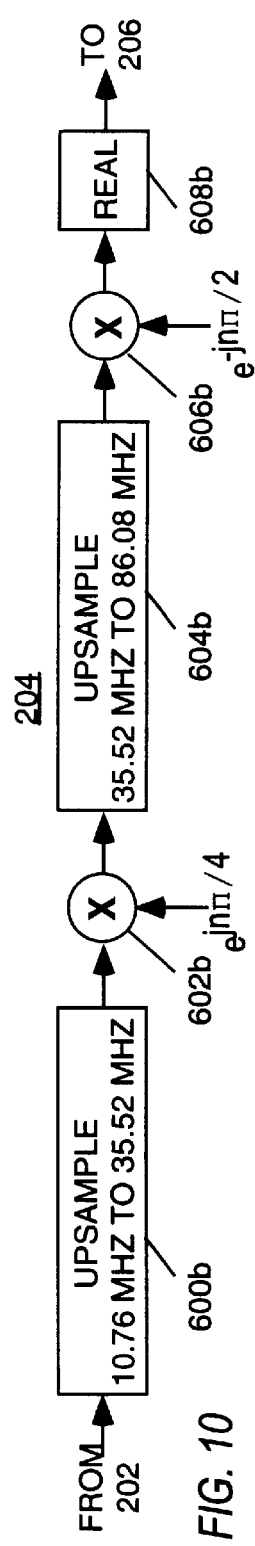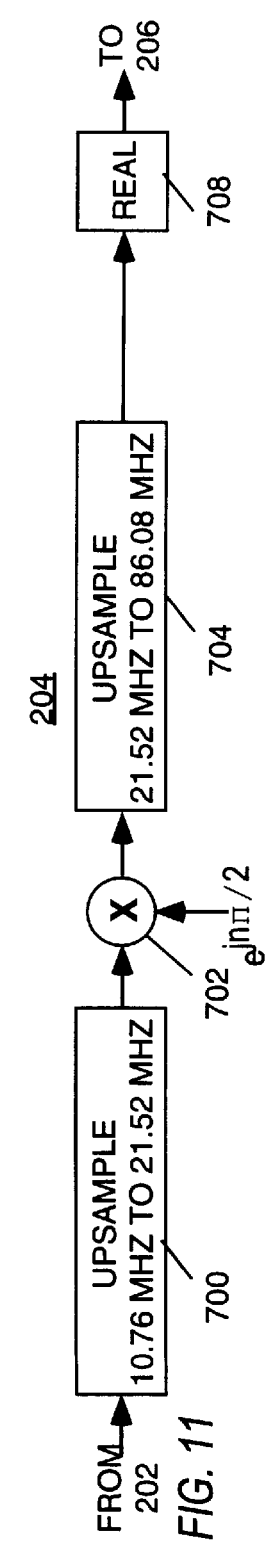

PULSE CODE MODULATED TO DC CENTERED VSB CONVERTER

BACKGROUND

1. Field of the Invention

The present invention relates to various approaches for processing an ongoing stream of digital samples which, when employed together, are suitable for use in a vestigial-sideband (VSB) digital modulator that derives a 6 MHz bandwidth input signal selectively centered either at 63 MHz (Channel 3), 69 MHz (Channel 4) or 5.38 MHz IF (baseband) for a television receiver and, more particularly, for a compressed digital television receiver or set top box. Related applications filed concurrently herewith are SIN (X)/X COMPENSATION CIRCUITRY Ser. No. 09/382,235; COMPLEX MODULATOR CARRIER SIGNAL GENERATOR Ser. No. 09/382,234; and A VSB DIGITAL MODULATOR Ser. No. 09/382,231.

2. Description of the Prior Art

Reference is made to the article "ATSC Re-modulator System" by Hauge et al., IEEE Transactions on Consumer Electronics, Vol. 44, No. 3, and August 1998. This article discloses a VSB digital re-modulator implementation to interconnect between various digital products (e.g., terrestrial digital broadcasting, satellites, digital cable set top boxes, cable modems, DVD, DVCR, PC's, etc.) and digital TV receivers. Such a VSB digital re-modulator is the digital equivalent to current analog re-modulators found in VCR's and video games.

There is a need for a simple and inexpensive approach to digital re-modulation capable of providing an integrated-circuit (IC) implementation of a VSB digital re-modulator that selectively derives a Channel 3, Channel 4 or baseband signal.

SUMMARY OF THE INVENTION

The present invention is directed to a digital pulse-code-modulation (PCM) DC-centered vestigial-sideband (VSB) converter which includes a modulator to which an ongoing sampled data stream of 1-sample-per-symbol successive PCM symbol samples are applied as a modulating signal. A sampled carrier stream, occurring at the rate of the signal samples, is applied as a carrier input to the modulator. The carrier stream is composed of, for example, a repeated 4-sample-sequence of 1, −1, −1, 1 sample values.

The signal developed by the modulator is applied to a bifurcated multiplexed N-tap root Nyquist FIR filter, which produces a VSB bifurcated complex output signal having a DC-centered real (±R) sampled data output stream of 1-sample-per-symbol sample values and a DC-centered imaginary (±I) sampled data output stream of 1-sample-per-symbol sample values.

BRIEF DESCRIPTION OF THE DRAWING

FIGS. 8, 9, 10 and 11 show embodiments of the multi-scale digital modulator of FIG. 2 employing a first design approach for deriving, at a predetermined sampling-frequency rate, streams of sample values defining respective data-modulated carrier frequencies for Channel 3, Channel 4 and baseband.

DESCRIPTION OF THE PREFERRED EMBODIMENTS

It is noted at the outset of this description, that the term "DC centered" refers to centering about a zero Hz frequency and not about a DC amplitude. Typically in this description, it is in reference to a signal modulation bandwidth which is centered on DC.

Figure 1:
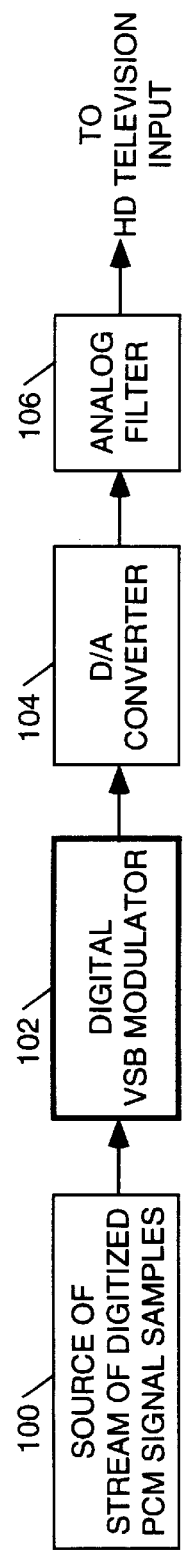
FIG. 1 is a functional block diagram of apparatus, including a VSB digital modulator for deriving an input signal to an HDTV from a stream of digitized PCM samples forwarded as an input to the modulator from a source of the stream.

Referring to FIG. 1, there is shown (1) a source of a stream of digitized pulse-code-modulation (PCM) signal samples 100, (2) a digital vestigial sideband (VSB) modulator 102, (3) a digital to analog (D/A) converter 104 and (4) an analog filter 106. Source 100 includes the digital product from which initial signal information is obtained together with digital processing circuitry, if any, required to add additional desired signal information and/or to modify the form of the signal information to thereby derive the sample-stream output from source 100 that is applied as an input to digital VSB modulator 102. Preferred embodiments of digital VSB modulator 102, which incorporate features of the present invention, are described in detail below. In any event, the digital output from digital VSB modulator 102 comprises a stream of modulated data samples occurring at a given relatively high sample-frequency rate, which, after being converted to an analog signal by D/A converter 104, gives rise selectively to a Channel 3, Channel 4 or IF baseband signal centered at 5.38 MHz. After being converted to an analog signal by the D/A converter 104, any resulting undesired frequency components lying outside of a frequency bandwidth above the given sample-frequency rate is removed by the analog filter 106.

Figure 2:
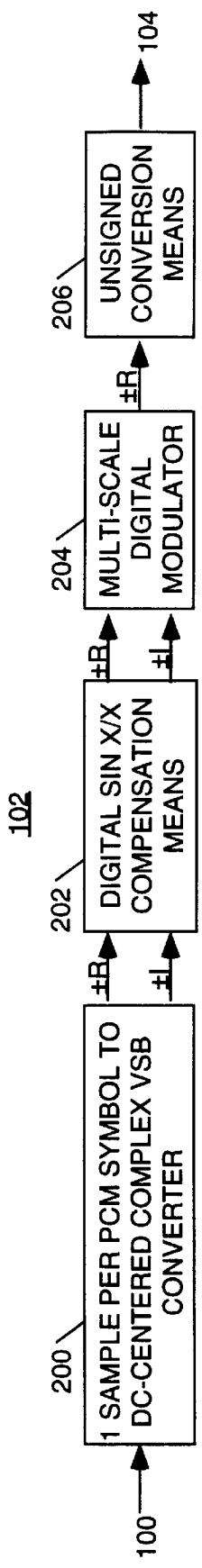
FIG. 2 is a functional block diagram of the components of the VSB digital modulator shown in FIG. 1.

As shown in FIG. 2, the digital VSB modulator 102 comprises a 1 sample per PCM symbol to DC-centered complex VSB converter 200 (which is described in detail below in connection with FIGS. 3–7), digital sin x/x compensator, multi-scale digital modulator 204 (which is described in detail below in connection with FIGS. 8–16) and unsigned converter 206 (which is described in detail below).

The stream of signal PCM samples from source 100 is applied as an input to VSB converter 200, which derives 2 VSB output streams in signed real (R) and imaginary (I) complex form that are applied as inputs to sin x/x compensator 202. The 2 output streams from sin x/x compensator 202, still in signed complex form, are applied as inputs to multi-scale digital modulator 204, which derives a single output stream in signed R form that is forwarded as an input to the D/A converter 104 through the unsigned converter 206 (i.e., the operation performed by unsigned converter 206 is to add the same given positive (+) magnitude value to the signed (±) magnitude value of each symbol of the single output stream, wherein the given positive magnitude value is sufficient to result in the sum magnitude value of each symbol of the output stream from unsigned converter 206 being positive and, therefore, all symbol samples applied as an input to D/A converter 104 have only positive values).

For illustrative purposes in describing a preferred embodiment of the present invention, it is assumed that (1) each of the stream of PCM symbol samples applied as an input to the VSB converter 200 comprises 4 bits defining a 3 bit (8VSB) or 4 bit (16VSB) real data occurring at a sample-frequency clock rate of 10.76 MHz; (2) each of VSB converter 200 and digital sin x/x compensator operate at a sample-frequency clock rate of 10.76 MHz and (3) the input, and output sample-frequency clock rates of the multi-scale digital modulator 204 are, respectively, 10.76 MHz and 86.08 MHz (i.e., 8 times 10.76 MHz), while the operating sample-frequency clock rate of the multi-scale digital modulator 204 may also include at least one sub-harmonic of 86.08 MHz intermediate 10.76 MHz and 86.08 MHz.

Figure 3:
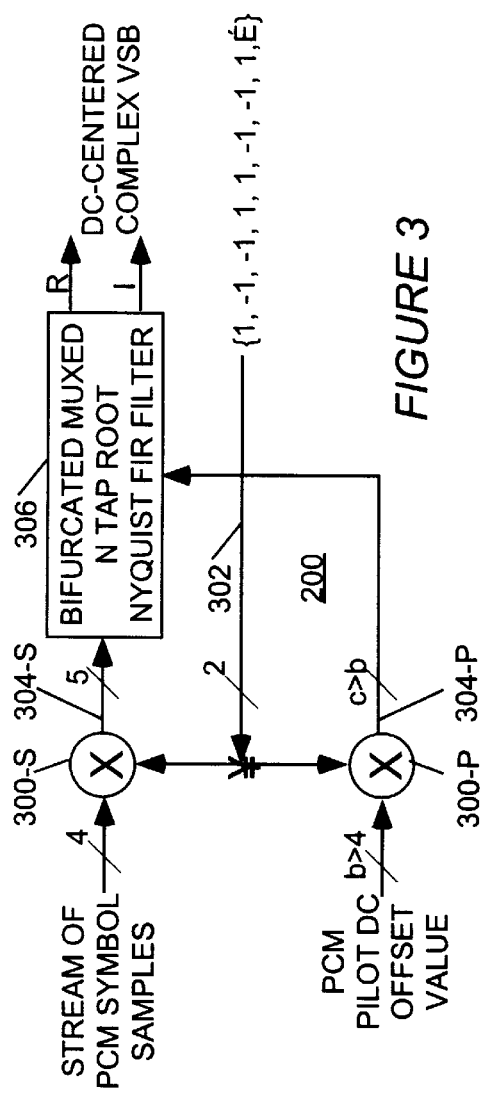
FIG. 3 diagrammatically shows a preferred embodiment of the 1 sample per PCM symbol to DC-centered VSB converter shown in FIG. 2 and FIG. 4 schematically shows the details of the bifurcated multiplexed N tap root Nyquist FIR filter shown in FIG. 3.

Referring now to FIG. 3, in addition to the aforesaid stream of 4-bit PCM symbol samples applied as an input to the VSB converter 200, the VSB converter 200 also has a more precise PCM pilot DC value, defined by b>4 bits, available to it for adjusting a pilot-tone amplitude to a desired level. This b>4 bit PCM pilot DC value is applied as a modulating signal to a modulator 300-P, while each 4 bit PCM symbol sample of the stream is applied as a modulating signal to a modulator 300-S. An ongoing stream 302, occurring at the 10.76 MHz sample-frequency rate, of a repeated 4-bit sequence composed of the digital sign values {1, −1, −1, 1}, is applied as a DC-centered carrier to both modulators 300-P and 300-S. This ongoing stream 302, which is {1, −1, −1, 1, 1, −1, −1, 1, 1 . . . } of samples, can be considered to define the quadrant values of each successive cycle of the function $\cos(n\pi/2)-\sin(n\pi/2)=1.414*\cos(•*n/2+•/4)$, where 1.414 is a rational approximation of $\sqrt{2}$ and n=symbol index. Thus, the modulated pilot output stream 304-P from the modulator 300-P and the modulated data signal output stream 304-S from modulator 300-S constitute real signals that are used to define complex signals in coded form; that is such a real signal comprises an ongoing symbol-modulated sinusoidal wave sampled at each quadrant of each cycle thereof, wherein the real "cos" component comprises ± signed non-zero values that without decoding constitute the ± signed non-zero valued R component of the corresponding complex signal, but the real "sin" component comprises zero values that in coded form constitute the zero-valued ±I component of the corresponding complex signal. Therefore, both modulated pilot output stream 304-P and the modulated data signal output stream 304-S, which are applied as inputs to bifurcated multiplexed N-tap root Nyquist finite impulse response (FIR) filter 306, are real DC-centered signals comprising only 1 sample per symbol. However, as indicated in FIG. 3, filter 306 derives an output comprising an ongoing stream of complex DC-centered VSB symbol samples in which both the ±R and ±I components have non-zero values.

Figure 4:
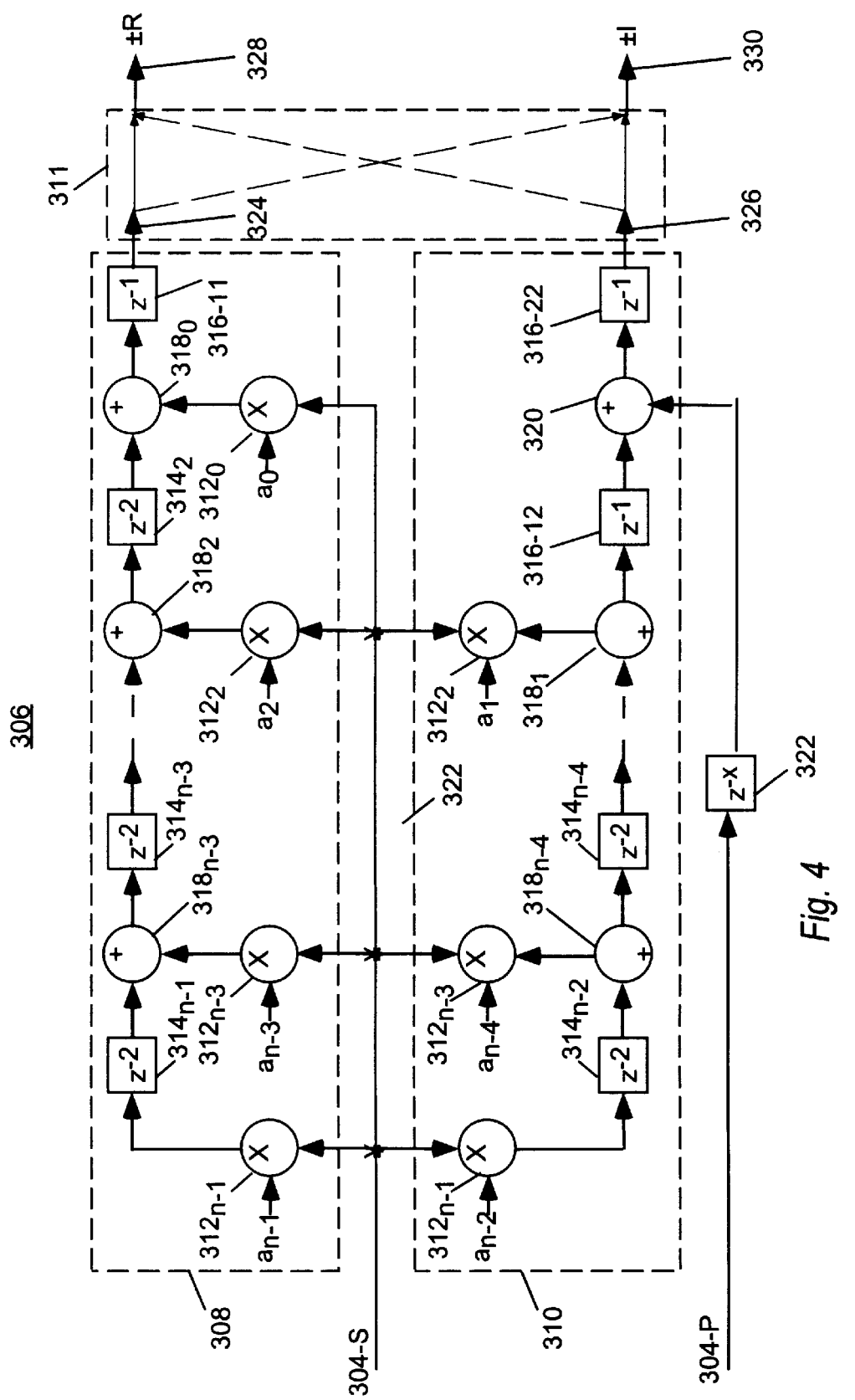

More particularly, the N-tap filter 306 is a single filter having an odd number of taps (e.g., 55 taps for example). However, as shown in FIG. 4, N-tap filter 306 is organized into first input-weighted (N+1)/2-tap FIR sub-filter 308 (i.e., a 28-tap sub-filter for example), second input-weighted (N−1)/2-tap FIR sub-filter 310 (i.e., a 27-tap sub-filter for example) and multiplexer 311.

The first sub-filter 308 comprises all the even-numbered taps 0, 2, 4. (N−3) and (N−1) of the N-tap filter 306, while second sub-filter 310 comprises all the odd-numbered taps 1, 3, 5 . . . (N−4) and (N−2) of N-tap filter 306. Structurally, first sub-filter 308 includes (1) respective multiplier means $312_{n-1}$, $312_{n-3}$, . . . $312_2$ and $312_0$, each having an appropriate value of a corresponding one of coefficients $a_{n-1}$, $a_{n-3}$, . . . $a_2$ and $a_0$ applied as a multiplier input thereto, (2) respective 2-sample-period delay latches $314_{-1}$, $314_{n-3}$, . . . $314_4$ and $314_2$ together with 1-sample-period delay latch $316_{11}$ (with the sample frequency being 10.76 MHz) and (3) summers $318_{n-3}$, . . . $318_2$ and $318_0$. Structurally, second sub-filter 310 includes (1) respective multiplier means $312_{n-2}$, $312_{n-4}$, . . . and $312_1$, each having the value of a corresponding one of coefficients $a_{n-2}, a_{n-4}, \ldots$ and $a_1$ applied as a multiplier input thereto (2) respective 2-sample-period delay latches $314_{n-2}$, $314_{n-4}$, . . . $314_5$ (not shown) and $314_3$ (not shown) together with 1-sample-period delay latches $316_{12}$ and $316_{22}$, and (3) summers $318_{n-4}$, . . . $318_1$ together with summer 320. Further, the value of each successively-occurring symbol sample of the DC-centered data signal output stream 304-S is simultaneously applied as a multiplicand input both to each and every one of multiplier means $312_{n-1}$, $312_{n-3}$, . . . $312_2$ and $312_0$, of first sub-filter 308 and to each and every one of multiplier means $312_{n-2}$, $312_{n-4}$, . . . and $312_1$, of second sub-filter 310. In addition, the value of each successively-occurring sample of the DC-centered pilot output stream 304-P, after being operated on by x clock delay 322 [where x=(center tap index) mod 4] is applied as an addend input to summer 320.

It is apparent that filter 306 and each of its component sub-filters 308 and 310 are real (i.e., not complex) filters. Nevertheless, the combination of sub-filter 308, sub-filter 310 and multiplexer 311 operate together to provide a complex output from filter 306. First, the operation of each of sub-filters 308 and 310 results in the sampled data stream at its output including both signed R and signed I sample values in each successive 4-sample sequence. Second, a data output stream 324 from sub-filter 308 has undergone a total delay that is one clock period longer than the total delay undergone by data output stream 326 from sub-filter 310. Therefore, the relative relationships between the ±R and ±I samples of data output stream 324 from sub-filter 308 as a function of the 10.76 MHz sampling-frequency periods and the ±R and ±I samples of data output stream 326 from sub-filter 310 as a function of the 10.76 MHz sampling-frequency periods are as follows:

TABLE 1

| Sample Periods | 1 | 2 | 3 | 4 | 5 | . . . |
|---|---|---|---|---|---|---|
| Output 324 | R | −I | −R | I | R | . . . |
| Output 326 | −I | −R | I | R | −I | . . . |

However, as indicated in FIG. 4, data output streams 324 and 326 from sub-filters 308 and 310 are applied as data input streams to multiplexer 311, which toggles each sample period at the sample-frequency clock rate of 10.76 MHz to (1) connect data output stream 324 from sub-filter 308 to ±R data output stream 328 during each odd sample period and to ±I data output stream 330 during each even sample period and (2) connect data output stream 326 from sub-filter 310 to ±I data output 330 during each odd sample period and to ±R data output stream 328 during each even sample period. Therefore, the relative relationships between the ±I samples of data output stream 330 as a function of successive sample periods and the ±R samples of output 328 as a function of successive sample periods are as follows:

TABLE 2

| Sample Periods | 1 | 2 | 3 | 4 | 5 | ... |
|---|---|---|---|---|---|---|
| Output 328 | R | −R | −R | R | R | ... |
| Output 330 | −I | −I | I | I | −I | ... |

Figure 5:
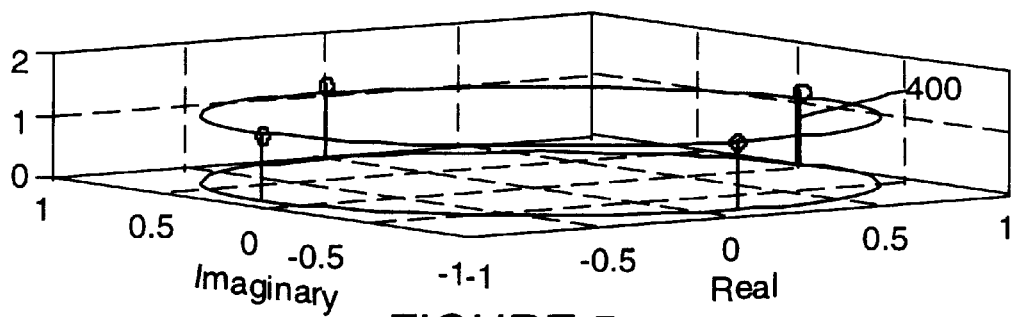
FIGS. 5, 6, and 7 together, graphically show the manner by which the operation of the bifurcated multiplexed N tap root Nyquist FIR filter shown in FIG. 4 generates the VSB converter output.
Figure 6:
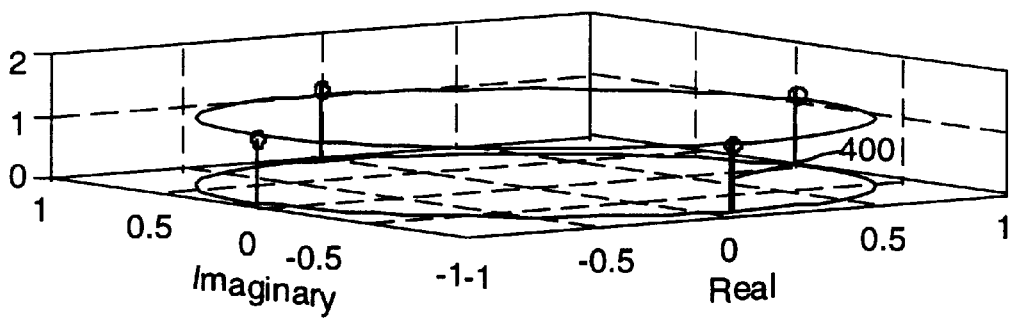
Figure 7:
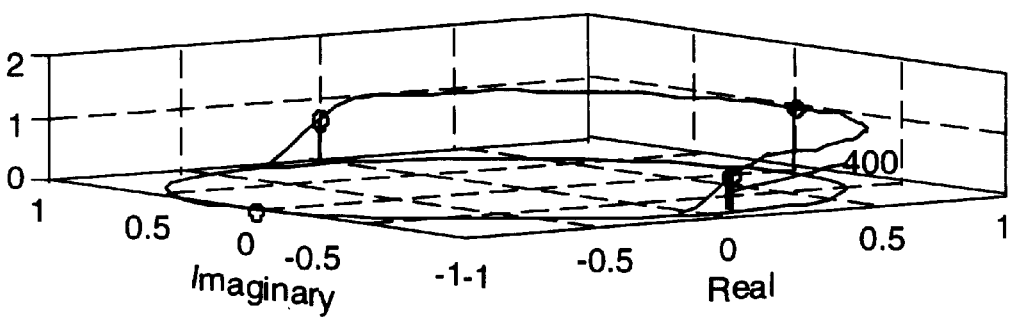

Reference is now made to FIGS. 5, 6 and 7. FIG. 5 shows the relationship in the Z domain of the normalized magnitude value 1 of each of successive samples in the sample-stream output 324 from the first sub-filter 308 as a function of the location of that sample in the real-imaginary plane (where thickened line 400 represents the location of the output 324 sample during sample period 1 of Table 1). FIG. 6 shows the relationship in the Z domain of the normalized magnitude value 1 of each of the successive samples in the sample-stream output 326 from second sub-filter 310 as a function of the location of that sample in the real-imaginary plane (where thickened line 400 now represents the location of the output 326 sample during sample period 1 of Table 1). By comparing FIG. 6 to FIG. 5, it is apparent that FIG. 6 represents a ¼ sequence-cycle rotation in the clockwise direction of FIG. 5. The operation of multiplexer 311 effectively sums the sample-stream output 324 from first sub-filter 308 and the sample-stream output 326 from second sub-filter 310. FIG. 7, which shows the relationship in the Z domain of the normalized magnitude value of each of successive samples in the sample-stream of this sum (as represented by outputs 328 and 330 of Table 2). As indicated in FIG. 7, the normalized magnitude value of 1 in the first ¼ of a sequence-cycle and fourth ¼ of a sequence-cycle drops to a normalized magnitude value of 0 in the second ¼ of a sequence-cycle and third ¼ of a sequence-cycle. The result is that the upper VSB signal energy is captured, while the lower sideband energy is removed. Thus, the real output 328 and imaginary output 330 shown in FIG. 4 constitute the DC-centered complex VSB output of filter 306 shown in FIG. 3.

The above-described 1 sample per PCM symbol to DC-centered VSB converter with pilot tone amplitude control is significantly less complex and costly to implement in hardware than the conventional 2 sample per PCM symbol to DC-centered VSB converter with pilot tone amplitude control. First, the need for only 1 sample per PCM symbol rather than 2 sample per PCM symbol reduces hardware implementation by 50%. Second, the use of real modulators 300-S and 300-P, rather than complex modulators, further reduces hardware implementation. Third, the use of a single bifurcated real n-tap filter, rather than the use of two (i.e., complex real and imaginary) n-tap filters provides an additional 50% savings in filter hardware. Fourth, the use of a single bifurcated real n-tap filter allows a unique pilot amplitude control method that provides an additional 35% savings in hardware. Fifth, the fact that no complex math is required to generate a complex output from the described 1 sample per PCM symbol to DC-centered VSB converter further reduces implementation hardware.

Returning to FIG. 2, it will be seen that, in the preferred embodiment of the invention, the digital sin x/x compensator is situated between the DC-centered complex VSB sample-stream output from VSB converter 200, that occurs at a 10.76 MHz sample-frequency rate, and the input to the multi-scale digital modulator 204. This is because it is preferable to implement digital sin x/x compensation at a lower 10.76 MHz sample-frequency rate than at a higher sample-frequency rate. Compensation at higher sample-frequency rates has the disadvantages of generally higher dissipation, higher current, and production of more undesirable electromagnetic interference (EMI). However, digital sin x/x compensation may be performed at any sample frequency rate in the system (including 86.08 MHz) prior to any actual modulation of the complex ±R and ±I data sample-streams on a carrier in multi-scale digital modulator 204. Therefore, multi-scale digital modulator 204 will be described in detail before sin x/x compensator 202 is described in detail.

Multi-scale digital modulator 204, in response to 1 sample per symbol ±R and ±I streams applied as inputs thereto occurring at sample-frequency rates of 10.76 MHz, selectively derives, as a user-controlled modulated output, (1) a signed 8 sample per symbol ±R stream centered at a relatively low pseudo-carrier frequency of −23.08 MHz, (2) a signed 8 sample per symbol R stream centered at a still lower pseudo-carrier frequency of −17.08 MHz, or (3) a signed 8 sample per symbol ±R stream centered at a very low carrier frequency of 5.38 MHz, all of which output streams occur at a sample-frequency rate of 86.08 MHz. The −23.08 MHz digital output stream, after conversion to analog by unsigned converter 206 and D/A converter 104, results in both an undesired symbol-stream modulated 23.08 MHz analog signal and a desired symbol-stream modulated 63 MHz (Channel 3) analog image signal (i.e., 63 MHz= (86.08−23.08) MHz). Similarly, the −17.08 MHz digital output stream results in both an undesired symbol-stream modulated 17.08 MHz analog signal and a desired symbol-stream modulated 69 MHz (Channel 4) analog image signal (i.e., 69 MHz=(86.08−17.08) MHz). The 5.38 MHz digital output stream results directly in a desired symbol-stream modulated 5.38 MHz analog signal.

Multi-scale digital modulator 204 may be implemented either in accordance with a first preferred approach shown in FIGS. 8–11, discussed below, or a second preferred approach shown in FIGS. 12–16, discussed below. Both approaches make use of modulation by a complex exponential carrier in the form of an ongoing stream of a repeated short sequence similar in certain respects to the ongoing stream of the repeated short sequence shown in FIG. 3. More particularly, the modulator includes a resampler for resampling the modulation signal followed by a complex modulator provided with an exponential carrier. The resampling ratio is selected so that the exponential carrier may be realized by a repeated relatively short sequence of values occurring at the output sample rate. The exponential carrier sequence may be generated by interpolation. The ideal interpolating filter for generating a carrier is represented by the function $$\frac{\mathrm{Sin}\left(\pi \cdot \frac{t}{T}\right)}{\left(\pi \cdot \frac{t}{T}\right)},$$

which is of infinite extent, non-causal and is of theoretical interest only. However, due to the periodicity and assumed infinite extent of an ongoing stream of a repeated short sequence, the output of any filter of any impulse response width applied to this repeated short-sequence ongoing stream at a given time is a weighted sum of the samples of this short sequence. The relationship between certain complex exponential carriers and short sequences is shown in the following Table 3, where n=sample index:

TABLE 3

| | |
|---|---|
| $e^{\pm j2n \cdot /3}$ | 1, −0.5 + (±j * 0.866), −0.5 − (±j * 0.866) |
| $e^{\pm jn \cdot /2}$ | 1, ±j, −1, −(±j) |
| $e^{\pm jn \cdot /3}$ | 1, 0.5 + (±j * 0.866), −0.5 + (j * 0.866), −1, −0.5 − (j * 0.866), 0.5 − (j * 0.866), |
| $e^{\pm jn \cdot /4}$ | 1, 0.707 + (±j * 0.707), −(±j), −0.707 + (±j * 0.707), −1, −0.707 − (±j * 0.707), −(±j), 0.707 − (±j * 0.707) |

If the number of terms in a sequence is 4 or less, negligible errors are incurred for all choices of interpolation functions. If the number of terms in a sequence is 6 or 8, negligible errors are incurred for certain interpolation functions (which include the interpolation functions used in either the aforesaid first or second implementation approach employed by multi-scale digital modulator 204).

Referring now to FIG. 8, there is shown an example of the first implementation approach for deriving the 8 sample per symbol ±R stream centered at −23.08 MHz (for use in generating the Channel 3 signal) as the multi-scale digital modulator's output from the 1 sample per symbol ±R and I streams applied as inputs thereto from sin x/x compensator 202. The sample-rate converter 500 effectively down samples the 10.76 MHz ±R and ±I data streams to 6.24 MHz by computing the interpolated value each 10.76 MHz sample would have if the data streams were sampled at 6.24 MHz. Specifically, such interpolated values involve the ratio factor 10.76/6.24, which is equivalent to 269/156 (that is a string of 269 sample periods at a 10.76 MHz sample-frequency rate are equivalent in length of time to a string of only 156 sample periods at a 6.24 MHz sample-frequency rate. However, in the preferred embodiment, the actual sample-frequency rate of the ±R and ±I streams at the output from sample-rate converter 500 (which are applied as a data input to complex first modulator 502) still remains at 10.76 MHz.

In accordance with the above discussion, the carrier input $e^{-jn\pi/2}$ to first modulator 502 constitutes an ongoing stream of the repeated 4-sample sequence 1, −j, −1, j at a sample-frequency rate of 10.76 MHz. Modulator 502 independently multiplies each of the samples of the R and I streams at the data input to modulator 502 by the corresponding samples of the ongoing stream at the carrier input to modulator 502 to provide two product streams, each of which includes both R an I samples. However, modulator 502 includes a multiplexer, similar in its operation to above-described multiplexer 311, for distributing all the R product samples of both product streams to an R output stream from modulator 502 and for distributing all the I product samples of both product streams to an I output stream from modulator 502 (with each of the R and I output streams from first modulator 502 being indicative of a −6.24/4=−1.56 MHz stream, which is sampled at a 10.76 MHz sample-frequency rate).

The R and I output streams from first modulator 502 are applied as inputs to sample-rate converter 504 which employs an 86.08 MHz clock and interpolation to both convert the 1 sample per symbol at the 10.76 MHz sample-frequency rate into an 8 sample per symbol at an 86.08 MHz sample-frequency rate and to effectively upsample the indicative first-modulated 6.24 MHz streams to 86.08 MHz, by computing the interpolated value each actual 86.08 MHz sample would have if the indicative first-modulated 6.24 MHz streams were sampled at 86.08 MHz. Specifically, such interpolated values involve the ratio factor 6.24/86.08, which is equivalent to 39/538 (that is a string of only 39 sample periods at an indicative 6.24 MHz sample-frequency rate are equivalent in length of time to a string of 538 sample periods at an 86.08 MHz sample-frequency rate. Therefore, the sample-frequency rate of the R and I streams at the output from sample-rate converter 504 (which are applied as a data input to complex second modulator 506) are now at 86.08 MHz.

In accordance with the above discussion, the carrier input $e^{-jn\pi/2}$ applied to the second modulator 506 constitutes an ongoing stream of the repeated 4-sample sequence 1, −j, −1, j at a sample-frequency rate of 86.08 MHz. Modulator 506 independently multiplies each of the samples of the R and I streams at the data input to modulator 506 by the corresponding samples of the ongoing stream at the carrier input to modulator 506 to provide two product streams, each of which includes both R an I samples 502 (with each of the R and I output streams from first modulator 502 being indicative of a −6.24/4=−1.56 MHz stream, which is sampled at a 10.76 MHz sample-frequency rate). However, modulator 506 includes a multiplexer, similar in its operation to above-described multiplexer 311, for distributing all the R product samples of both product streams to an R output stream from modulator 506 and for distributing all the I product samples of both product streams to "trash", so that only the R output stream from modulator 506 is forwarded as an input to the D/A converter 104 (as indicated by block 508 in FIG. 8).

Since the output stream from the first modulator 502 includes a symbol-modulated component centered at an indicated frequency of −6.24/4=−1.56 MHz due to the effect of each successive 4-sample sequence of the $e^{-jn\pi/2}$ carrier input thereto, the second modulator 506, which is cascaded with the first modulator 502 and receives this −1.56 MHz centered symbol-modulated component as an input, derives an R output stream which includes symbol-modulated components centered at −1.56 MHz, −86.08/4=−21.52 MHz and the resulting intermodulation frequency −1.56+(−21.52)=−23.08 MHz. It is this −23.08 MHz symbol-modulated component of the R output stream from multi-scale digital modulator 204 which gives rise to its 63 MHz (Channel 3) image in the analog signal output from D/A converter 104.

It should be noted that while neither the ratio factor 269/156 employed by sample-rate converter 500 or the ratio factor 39/538 employed by sample-rate converter 504 is an integer, the cascaded product 269/156*39/538=8 of these ratio factors is an integer which is just equal in value to the ratio of the 86.08 MHz sample-frequency rate of the 8 samples per symbol output stream from sample-rate converter 504 to the 10.76 MHz sample-frequency rate of the 1 sample per symbol input stream to sample-rate converter 500. Therefore, the fact that there is no 6.24 MHz clock for use with sample-rate converter 500 does not affect the accuracy of the interpolated symbol values of the 8 samples per symbol output stream from either sample-rate converter 504 or second modulator 506.

Referring now to FIG. 9, there is shown one species of the first implementation approach for deriving the 8 sample per symbol R stream centered at −17.08 MHz (for use in generating the Channel 4 signal) as the multi-scale digital modulator's output from the 1 sample per symbol R and I streams applied as inputs thereto from the sin x/x compensator 202. First, the sample-rate converter 600*a* differs from above-described sample-rate converter 500 in that the 10.76

MHz R and I streams are effectively upsampled to 17.76 MHz. That is, interpolated samples that would have occurred if the signal represented by the 10.76 MHz sampled signal were actually sampled at 17.76 MHz are computed. Specifically, such interpolated values involve the ratio factor 17.76/10.76, which is equivalent to 444/269 (that is a string of 444 sample periods at a 17.76 MHz sample-frequency rate are equivalent in length of time to a string of only 269 sample periods at a 17.76 MHz sample-frequency rate. Second, rather than the $e^{-jn\pi/2}$ carrier input to the above-described first modulator 502, the carrier input to the first modulator 602a is $e^{jn\pi/2}$, which constitutes an ongoing stream of the repeated 4-sample sequence 1, j, −1, −j. Third, the sample-rate converter 604a differs from above-described sample-rate converter 504 in that the 17.76 MHz R and I streams are effectively upsampled to 86.04 MHz by computing the interpolated value each 17.76 MHz sample would have if the streams were sampled at 86.08 MHz. Specifically, such interpolated values involve the ratio factor 86.08/17.76, which is equivalent to 269/111 (that is a string of 269 sample periods at an indicative 86.08 MHz sample-frequency rate are equivalent in length of time to a string of 111 sample periods at a 17.76 MHz sample-frequency rate. In other respects, the operations of elements 600a, 602a, 604a, 606a and 608a of FIG. 9 are similar to the above-described corresponding elements 500, 502, 504, 506 and 508 of FIG. 8.

Since the output stream from first modulator 602a includes a symbol-modulated component centered at an indicated frequency of 17.76/4=4.44 MHz due to the effect of each successive 4-sample sequence of the $e^{jn\pi/2}$ carrier input thereto, the second modulator 606a, which is cascaded with first modulator 602a and receives this 4.44 MHz centered symbol-modulated component as an input, derives an R output stream which includes symbol-modulated components centered at 4.44 MHz, −86.08/4=−21.52 MHz and the resulting desired intermodulation frequency 4.44+(−21.52)=−17.08 MHz. It is this −17.08 MHz symbol-modulated component of the R output stream from multi-scale digital modulator 204 that gives rise to its 69 MHz (Channel 4) image in the analog signal output from D/A converter 104.

A disadvantage in the hardware implementation of the one species shown in FIG. 9 is that sample-rate converter 600a needs to be of relatively high quality because of the small percent of Nyquist for which it is transparent. However, this need is relaxed in the alternative species shown in FIG. 10 by substituting the sample-rate converter 600b, which is effective in upsampling 10.76 MHz to 35.52 MHz, for sample-rate converter 600a, thereby permitting sample-rate converter 604b, which is effective in upsampling 35.52 MHz to 86.08 MHz, to be substituted for sample-rate converter 604a. However, in the case of FIG. 10, it is necessary to employ a $e^{jn\pi/4}$ carrier input to sample-rate converter 604b (where $e^{jn\pi/4}$ constitutes the ongoing repeated 8-sample sequence 1, 0.707+(±j*0.707), −(±j), −0.707+(±j*0.707), −1,−0.707−(±j*0.707), −(±j), 0.707 −(±j*0.707) at a sample-frequency rate of 86.08 MHz) in order for the second modulator 606b to derive an R output stream which includes symbol-modulated components centered at 4.44 MHz, −86.08/4=−21.52 MHz and the resulting desired intermodulation frequency 4.44+(−21.52)=−17.08 MHz of the symbol-modulated component of the R output stream from multi-scale digital modulator 204 that gives rise to its 69 MHz (Channel 4) image in the analog signal output from D/A converter 104.

In the foregoing apparatus, the resamplers such as elements 600a or 600b need not actually provide samples at the resampled rate (for example 17.76 MHz). What is required is that a number of samples be generated that would occur if resampled to that rate. The increased number of samples are then successively modulated with the exponential carrier sequence. This modulation is accomplished by application of the repeating carrier sequence such that successive samples are modulated by successive sequence values. All this can be accomplished, in the available time, because a clock of 86.08 MHz is available to effect interpolation of samples to produce e.g., the upsampled values, which values may be stored in memory and then read for modulation at an arbitrary sample rate. So also may the interpolation of e.g., the resamplers 604a or 604b, be performed at an arbitrary sample rate as long as the requisite number of samples (per input sample) are produced in intervals corresponding to the input sample periods (to realize real time operation). However, the modulated values provided by the output modulators (606a or 606b for example) must occur at a predetermined rate (86.08 MHz in this example) to produce the desired modulated carrier frequencies.

Referring now to FIG. 11, there is shown the first implementation approach for deriving the 8 sample per symbol R stream centered at a 5.38 MHz IF (for use in generating the baseband signal). The 1 sample per symbol R and I streams from sin x/x compensator 202 are applied to sample rate converter 700. Sample-rate converter 700 upsamples the 10.76 MHz R and I streams to 21.52 MHz. Since the ratio of 21.52 MHz is exactly twice 10.76 MHz, this conversion can be conventionally accomplished by using a 21.52 MHz sample-rate clock for sample converter 700 and inserting a zero-valued sample between each pair of successive samples of the 10.76 MHz R and I streams and then substituting the average of the sample values of that pair for its zero value.

The carrier input $e^{jn\pi/2}$ to modulator 702 constitutes an ongoing stream of the repeated 4-sample sequence 1, j, −1, −j at a sample-frequency rate of 21.52 MHz. Modulator 702 independently multiplies each of the samples of the R and I streams at the data input to modulator 502 by the corresponding samples of the ongoing stream at the carrier input to modulator 702 to provide two product streams, each of which includes both R an I samples. However, modulator 702 includes a multiplexer, similar in its operation to above-described multiplexer 311, for distributing all the R product samples of both product streams to an R output stream from modulator 702 and for distributing all the I product samples of both product streams to an I output stream from modulator 702 (with each of the R and I output streams from first modulator 702 being a 5.38 MHz stream, which is sampled at a 21.52 sample-frequency rate.

Sample-rate converter 704 is required to upsample the 21.52 MHz sample-rate R and I output streams of data from the first modulator to 702 to 86.08 MHz sample rate R and I output streams of data from the sample rate converter 704. This conversion can be conventionally accomplished by using an 86.08 MHz sample rate clock for sample rate converter 704 and inserting 3 zero-valued samples between each pair of successive samples of the 21.52 MHz R and I streams and then substituting an appropriate interpolated sample value for each of these 3 zero values of that pair. This results in a symbol modulated data component of the R output stream from the multi-scale digital modulator 204 at a sample-frequency rate of 86.08 MHz that gives rise to the desired 5.38 MHz IF baseband in the analog signal output from D/A converter 104.

In the first approach employed by multi-scale digital modulator 204, the implementation shown in FIG. 11, which requires only a single complex modulator, differs from the respective implementations shown in FIGS. 8, 9 and 10, each of which requires two cascaded complex modulators. However, in all of these first-approach implementations, each of the complex R and I input streams from complex modulators 502, 602a, 602b and 702 applied, respectively, as inputs to sample-rate converter 504, 604a, 604b and 704 (which convert 1 sample per symbol to 8 samples pre symbol) comprises sample values of one or more complex carrier frequencies that have already been modulated by data-symbol values.

Figure 12:
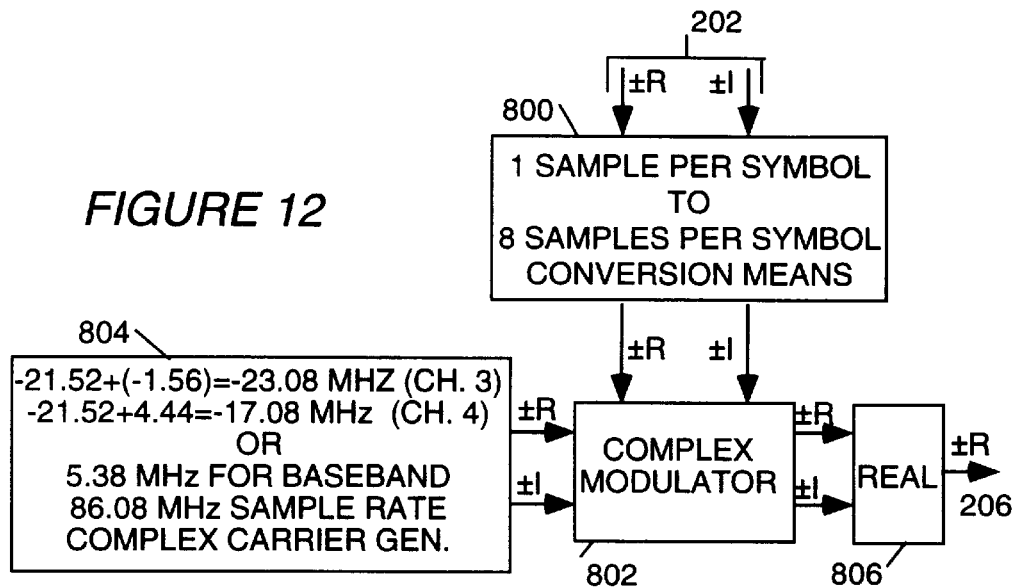
FIG. 12 shows an embodiment of the multi-scale digital modulator of FIG. 2 employing a second design approach for deriving, at a predetermined sampling-frequency rate, streams of sample values defining respective data-modulated carrier frequencies for Channel 3, Channel 4 and baseband.

In the second approach employed by multi-scale digital modulator 204, shown in FIG. 12, 1 sample per symbol to 8 samples per symbol converter 800, operating at an 86.08 MHz sample-frequency rate, has each of the complex ±R and ±I input streams from sin x/x compensator 202 applied as inputs thereto and each of the as yet unmodulated data-symbol valued complex ±R and ±I output streams therefrom applied as the modulating inputs to complex modulator 802. Complex carrier generator 804, operating at an 86.08 MHz sample-frequency rate, derives complex ±R and ±I carrier-output streams that selectively define the sample values of a constant-magnitude −23.08 MHz pseudo-carrier (produced by the complex product of constant magnitude −21.52 and −1.56 MHz frequencies) for Channel 3, the sample values of a constant magnitude −17.08 MHz pseudo-carrier (produced by the complex product of constant magnitude −21.52 and 4.44 MHz frequencies) for Channel 4 or the sample values of a constant magnitude 5.38 MHz for baseband. The complex ±R and ±I carrier output streams from complex carrier generator 804 are applied as carrier inputs to complex modulator 802, The modulated data-symbol valued complex ±R and ±I output streams from complex carrier generator 804, which occur at the 86.08 MHz sample-frequency rate, are applied as inputs to block 806, which forwards only the ±R output stream to the unsigned converter 206.

Figure 13:
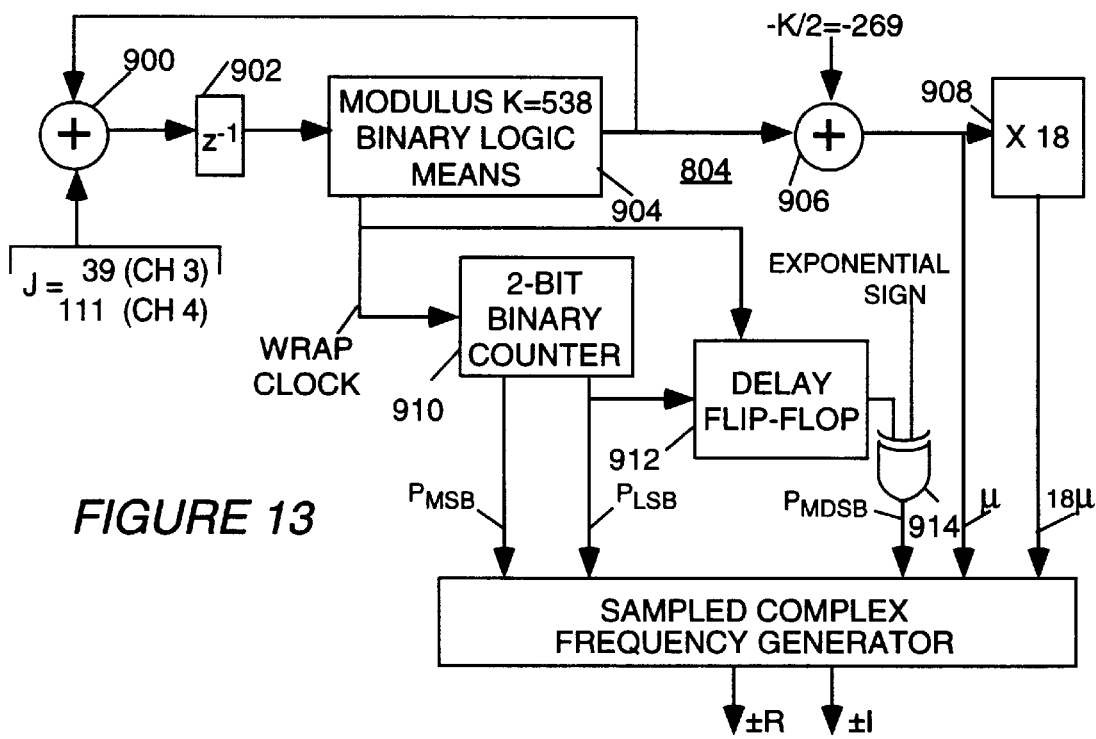
FIGS. 13, 15, and 16 show alternative embodiments of the complex carrier generator of FIG. 12.
Figure 15:
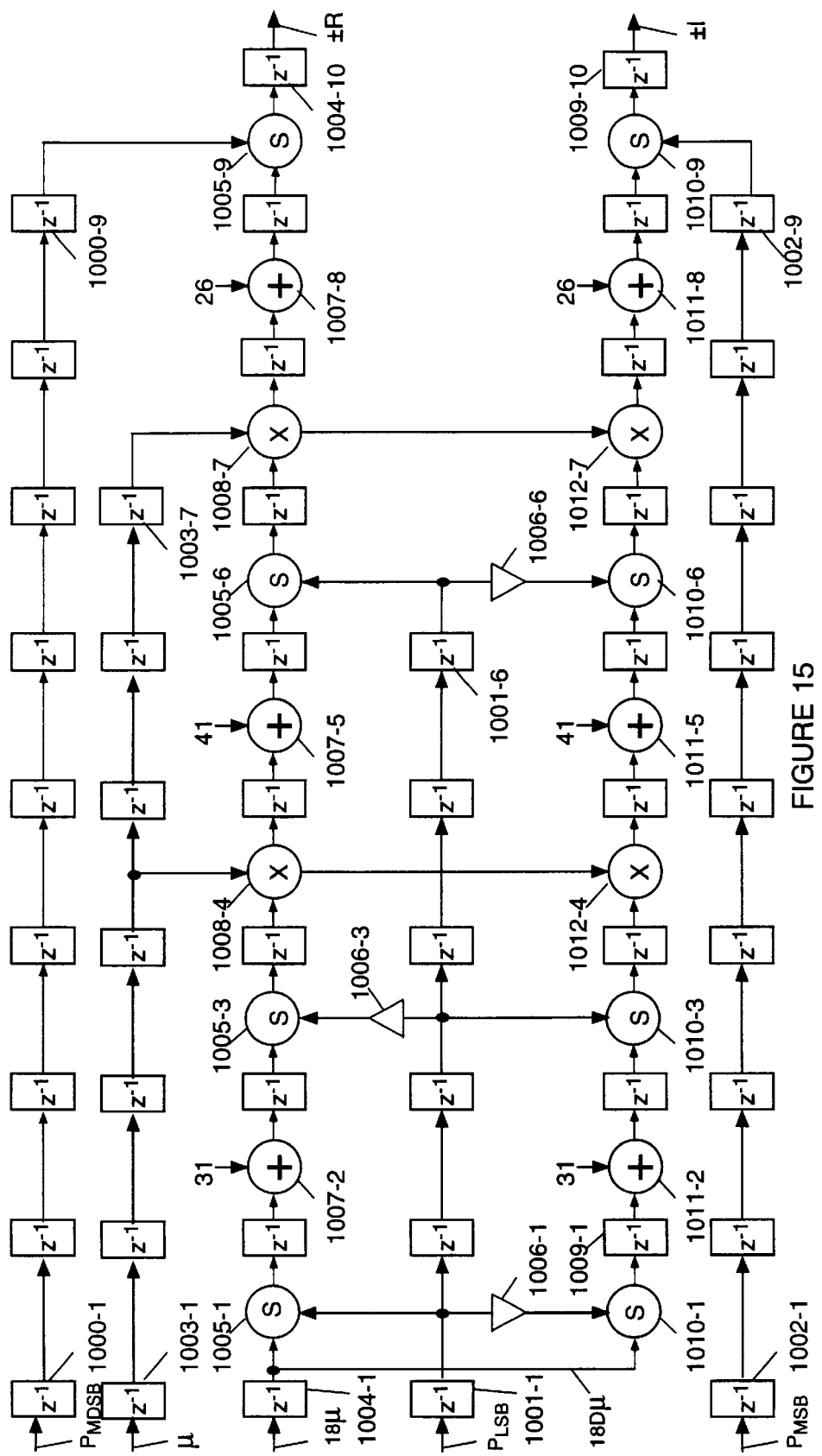

A first structural embodiment of complex generator 804 comprises the sampled complex frequency generator shown in FIG. 15, together with the phase control means shown in FIG. 13 that generates 5 ongoing streams of phase control values that are supplied as inputs to the sampled complex frequency generator of FIG. 15. As shown in FIG. 13, these 5 ongoing streams comprise (1) $\mu$ and 18 $\mu$ ongoing streams defining phase-control values needed for the generation in FIG. 15 of the phase values of ongoing ±R and ±I streams of a desired sampled sinusoidal frequency $F_o$ (i.e., 1.56 MHz for Channel 3 or 4.44 MHz for Channel 4 occurring at a given (i.e., 86.08 MHz) sample frequency $F_s$ and (2) $P_{LBX}$, $P_{MSB}$ and $P_{MDSB}$ ongoing rectangular timing waveforms also needed by the sampled complex frequency generator of FIG. 15.

Referring to FIG. 13, a constant value J (where J=39 for Channel 3 and where J=111 for Channel 4) is applied as a first addend to first summer 900. Each successive value of a sum output stream from first summer 900, after being delayed by 1 sample period of the given (i.e., 86.08 MHz) sample frequency F, by latch 902, is applied as an input to modulus K=538 binary logic means 904. Each value of the output stream from logic means 904 is applied both as a second addend to first summer 900 and as a first addend to second summer 906. Whenever the input value to modulus K binary logic means 904 is between 1 and K−1 (where K−1=537), the output value therefrom is equal to that input value, but whenever the input value thereto is higher than K−1 (e.g., K•538), the output value therefrom is equal to that input value minus K (e.g., K=538). Thus, the combination of J, first summer 900, latch 902 and modulus K binary logic means 904 cooperate to derive an output value from means 904 which increases by the positive value of J each sample period until the positive accumulated value is higher than the positive K value, at which time the positive K value is subtracted from this accumulated value. −K/2 (e.g., −K/2=−269) is applied as a second addend to second summer 906. Therefore, the respective sum values of the output stream from second summer 906, which fall in a range from −269 to +268 and constitute the $\mu$ phase-control input stream to the sampled complex frequency generator shown in FIG. 15, are centered about a 0 value (rather than having all positive values). The respective values of this $\mu$ phase-control input stream, after being multiplied by 18 in block 908, form an output stream that constitutes the 18$\mu$ phase-control input stream to this sampled complex frequency generator shown in FIG. 15.

Modulus K binary logic 904 applies a wrap clock as an input to the 2-bit binary counter 910 and the delay flip-flop 912 each time it subtracts a positive K value from its accumulated value. The respective binary states of the lowest significant bit $P_{LSB}$ and most significant bit $P_{MSB}$ output streams from the counter 910 are applied as timing-control input streams to the sampled complex frequency generator shown in FIG. 15. In addition, the $P_{MSB}$ output stream from the counter 910 is applied as an input stream to the delay flip-flop 912 and the output stream from the delay flip-flop 912 is applied to a first input of the EXCLUSIVE OR gate 914. A selected exponential sign value, which corresponds to the desired phase sign of the ±R output stream from the sampled complex frequency generator shown in FIG. 15 relative to the phase sign of the ±I output stream therefrom, is applied to a second input of EXCLUSIVE OR gate 914. The output stream from the EXCLUSIVE OR gate 914 constitutes the $P_{MDSB}$ timing-control input stream to the sampled complex frequency generator shown in FIG. 15.

Referring now to FIG. 15, the $P_{DMSB}$ timing-control input is applied to a chain of nine 1 sample-period (e.g., 86.08 MHz period) delay latches 1000-1 to 1000-9; the $P_{LSB}$ timing-control input is applied to a chain of six 1 sample-period delay latches 1001-1 to 1001-6; the $P_{MSB}$ timing-control input is applied to a chain of nine 1 sample-period delay latches 1002-1 to 1002-9; the g phase-control input is applied to a chain of seven 1 sample-period delay latches 1003-1 to 1003-7, and the 18$\mu$ phase-control input is applied to an R chain comprising ten 1 sample-period delay latches 1004-1 to 1004-10.

Immediately following each of delay latches 1004-1, 1004-3, 1004-6 and 1004-9 of the R chain is a corresponding one of sign (S) circuits 1005-1, 1005-3, 1005-6 and 1005-9. The sign value of each of sign circuits 1005-1 and 1005-6 is determined in accordance with the binary value of the output from corresponding one of delay latches 1001-1 and 1001-6. Due to the presence of inverter 1006-3, the sign value of sign circuits 1005-3 is determined in accordance with the negative of the binary value of the output from delay latch 1001-3. The sign value of sign circuits 1005-9 is determined in accordance with the binary value of the output from delay latch 1000-9.

Immediately following each of delay latches 1004-2, 1004-5 and 1004-8 of the R chain is a corresponding one of summers 1007-2, 1007-5 and 1007-8. The value 31 is added by summer 1007-2 to the output value from delay latch 1004-2; the value 41 is added by summer 1007-5 to the output value from delay latch 1004-5, and the value 26 is added by summer 1007-8 to the output value from delay latch 1004-8.

Immediately following each of delay latches 1004-4 and 1004-7 of the R chain is a corresponding one of multipliers 1008-4 and 1008-7. Multiplier 1008-4, which performs the R portion of a first complex exponential modulating function, multiplies the output value from delay latch 1004-4 by the output value from delay latch 1003-4 and multiplier 1008-7, which performs the R portion of a second complex exponential modulating function, multiplies the output value from delay latch 1004-7 by the output value from delay latch 1003-7. The stream of output values from latch 1004-10 of FIG. 15 constitutes the ±R output stream from complex carrier generator 802. It will be recognized by those skilled in the art of digital circuit design that the signal output from the summer 1007-8 is described by a polynomial function of the form $\mp\alpha\mu^3 \mp \beta\mu^2 \pm \kappa\mu + \rho$. In the exemplary circuit of FIG. 15 the values of $\alpha$, $\beta$, $\kappa$ and $\rho$ are 18, 31, 41 and 26 respectively. The last sign circuit 1005-9 in the processing chain effectively multiplies the generated values by a repeating sequence of values that determines the polarity of the resulting signal.

The ±I output stream from complex carrier generator 802 is derived in FIG. 15 by applying the output stream 18, from delay latch 1004-1 (i.e., the 18$\mu$ input stream to FIG. 15 delayed by 1 sample period) to an I chain that corresponds with the aforesaid R chain except for the absence of a delay latch corresponding to delay latch 1004-1. Specifically, the I chain comprises delay latches 1009-2 to 1009-10, sign circuits 1010-1, 1010-3, 1010-6 and 1010-9, summers 1011-2, 1011-5 and 1011-8, and multipliers 1012-4 and 1012-7.

Due to the presence of inverters 1006-1 and 1006-6, the sign value of each of sign circuits 1010-1 and 1010-6 is determined in accordance with the negative of the binary value of the output from corresponding one of delay latches 1001-1 and 1001-6. The sign value of sign circuits 1010-3 is determined in accordance with the binary value of the output from delay latch 1001-3. The sign value of sign circuits 1010-9 is determined in accordance with the binary value of the output from delay latch 1002-9.

Summers 1011-2, 1011-5 and 1011-8 of the I chain perform the same function as summers 1007-2, 1007-5 and 1007-8 of the R chain and multipliers 1012-4 and 1012-7 of the I chain perform the I portion of first and second exponential modulating functions similar to the of first and second exponential modulating functions for the R chain performed by multipliers 1008-4 and 1008-7. The output of the summer 1011-8 may be described by the polynomial function $\pm 18\mu^3 \pm 31\mu^2 \mp 41\mu + 26$. The sign circuit 1010-9 determines the polarity of the ±I output signal.

In the operation of the sampled complex frequency generator shown in FIG. 15, the type of wave shape that is generated by the ±R and ±I sampled output streams from this sampled complex frequency generator is determined by the value that multiplies $\mu$, and the respective values of the addends applied to the summers of the R and I chains. In the present case, the respective values 18, which multiplies $\mu$, and 31, 41 and 26, which are the addends applied to the summers of the R and I chains, are minimum alias energy 4-tap interpolation values which define a complex sinusoidal wave shape for the ±R and ±I sampled output streams from this sampled complex frequency generator. However, the generated desired frequency value $F_o$ at a sampling frequency $F_s$ of these ±R and ±I sampled output streams is determined by the successive sampled phase values of the $\mu$ and 18$\mu$ input streams applied to FIG. 15 (since frequency is equal to the time rate of change of phase). More specifically, the ratio $4F_o/F_s$ is equal to the integer ratio of J/K in FIG. 13, so long as $F_o/F_s \bullet \frac{1}{4}$. Thus, the appropriate desired frequencies −1.56 MHz and −21.52 MHz for deriving a −23.08 MHz pseudo-carrier at a sampling frequency of 86.08 MHz for Channel 3 are generated by a value of 39 for J and a value of 538 for K. Similarly, the appropriate desired frequencies 4.44 MHz and −21.52 MHz for deriving a −17.08 MHz pseudo-carrier at a sampling frequency of 86.08 MHz for Channel 4 are generated by a value of 111 for J and a value of 538 for K. Further, a desired 5.38 MHz baseband carrier $F_o$ is derived for $F_s$=86.08 MHz by employing an integer value of 269 for J and an integer value of 1076 for K, thereby providing J/K=¼.

Figure 14:

In some cases, implementation hardware may be minimized by inserting a rescaler 916, shown in FIG. 14, between the second summer 906 and ×18 block 908. For instance, in hardware capable of selectively deriving the 5.38 MHz baseband carrier, the appropriate carrier for Channel 3 or the appropriate carrier for Channel 4 (in which the value 39, 111 or 269 is selectively employed for J), it might be desirable to employ the rescaler 916 to increase the value range extending from −269 to 268, used to derive the appropriate carrier for either Channel 3 or Channel 4, to −538 to 537 for use in deriving the 5.38 MHz baseband carrier.

The benefits of the phase control circuit shown in FIG. 13 is that it can be used with FIG. 15 to generate an exact desired frequency value and that it does not require a relatively complicated and costly divider in its hardware implementation.

Figure 16:
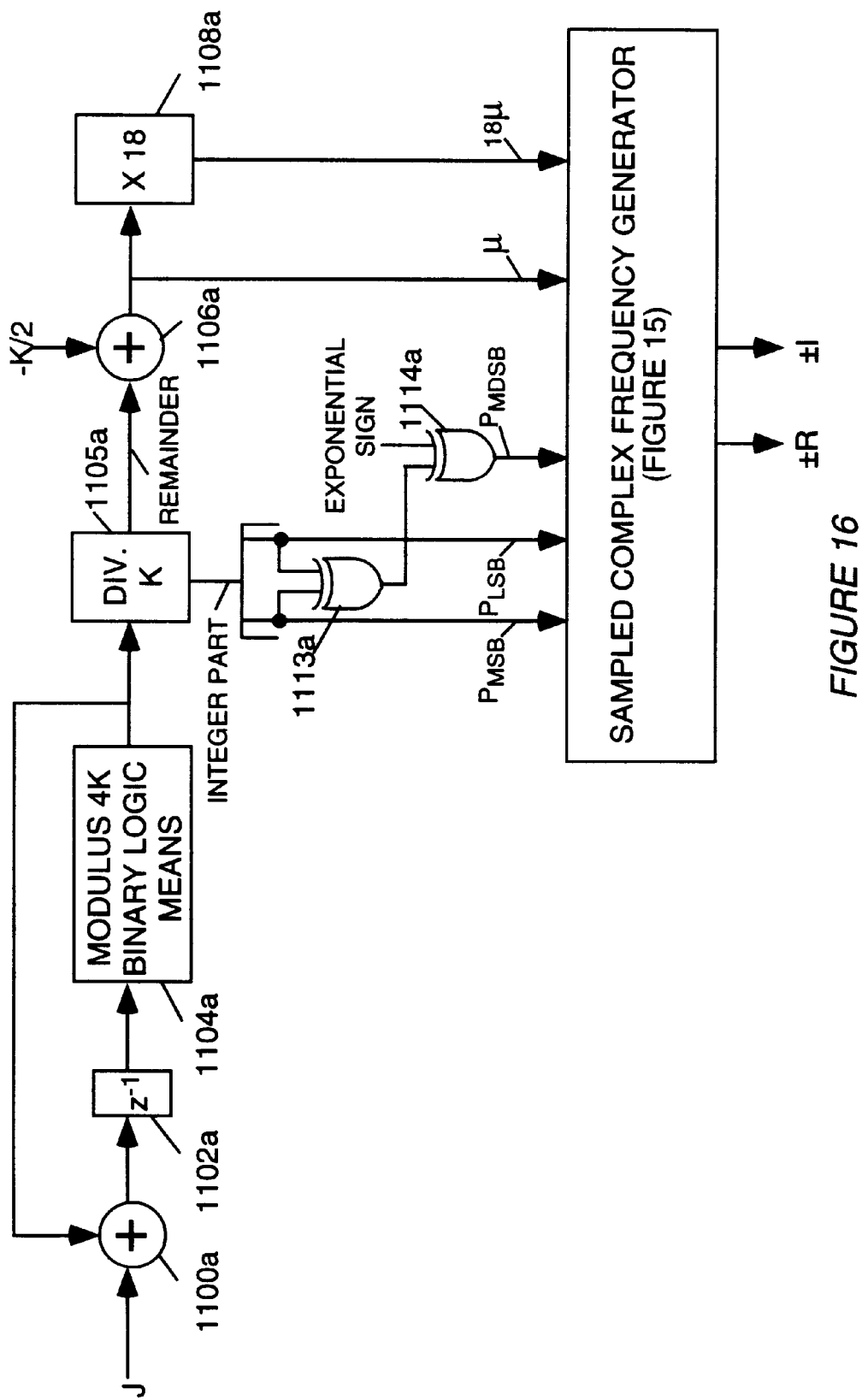

An alternative phase control circuit, is shown in FIG. 16. The benefit of the FIG. 16 alternative phase control circuit is that the generated desired frequency value is exact.

Referring now to FIG. 16, a constant value J is applied as a first addend to first summer 1100a. Each successive value of a sum output stream from the first summer 1100a, after being delayed by 1 sample period of the sample frequency $F_s$ by latch 1102, is applied as an input to modulus 4K binary logic 1104a. Each value of the output stream from logic 1104a is applied both as a second addend to the first summer 1100a and as an input to the K divider 1106a. A first output stream from the K divider 1105a, defining successive remainder values of the quotient computed thereby, is applied as a first addend to a second summer 1106a, which has the value −K/2 applied as a second addend. The respective sum values of the output stream from the second summer 1106a, which fall in a range from −K/2 to K/2−1 and constitute the g phase-control input to FIG. 15, are centered about a 0 value (rather than having all positive values). The respective values of this $\mu$ phase-control input, after being multiplied by 18 by block 1108a, form a phase-control output stream that constitutes the 18$\mu$ phase control input to FIG. 15. The K divider 1105a also derives a second output stream that defines successive 2-bit integer-part values of the quotient computed thereby, since 4K/K=4. Thus, the second output streams comprise a $P_{LBS}$ timing-control stream, defining the binary state of the lowest significant bit of each 2-bit integer-part value, and a timing-control $P_{MSB}$ stream, defining the binary state of the most significant bit of each 2-bit integer-part value, which timing-control $P_{LSB}$ and $P_{MSB}$ streams are applied both as inputs to FIG. 15 and as first and second inputs to the EXCLUSIVE OR gate 1113a. The output stream from the EXCLUSIVE OR gate 1113a is applied as a first input to the EXCLUSIVE OR gate 1114a. Applied as a second input to EXCLUSIVE OR gate 1114a is an exponential sign value, which corresponds to the desired phase sign of the ±R output stream from the sampled complex frequency generator shown in FIG. 15 relative to the phase sign of the ±I output stream therefrom. The output stream from the EXCLUSIVE OR gate 1114a is applied as the $P_{MDSB}$ timing-control input stream to FIG. 15.

The sampled ±R-valued output stream from multi-scale digital converter 204, after being converted to all positive (+) R-valued output stream by the unsigned converter 206, is applied as a stream of digital samples to the input of the D/A converter 104. The analog output from D/A converter 104 includes a 6 MHz symbol bandwidth signal centered on the image frequency (69 MHz for Channel 4 or 63 MHz for Channel 3) with respect to the sampling-rate frequency (86.08 MHz) of a 6 MHz symbol bandwidth signal centered on the pseudo-carrier frequency (−17.08 or −23.08 MHz) or a 6 MHz symbol bandwidth baseband signal centered on 5.38 MHz. Analog filter 106 has a frequency pass band which passes the 69 MHz centered Channel 4 signal, the 63 MHz centered Channel 3 signal and the 5.38 MHz centered baseband signal, but which rejects both the symbol-modulated −17.08 and −23.08 MHz pseudo-carrier signals.

Figure 17:
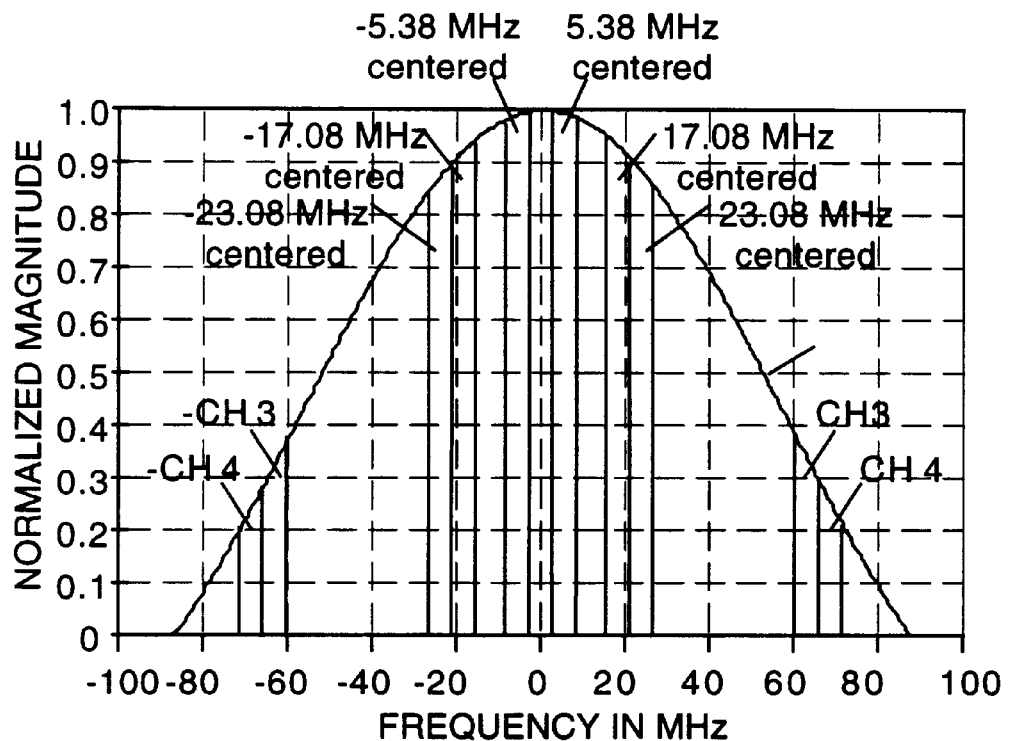
FIG. 17 is a graph illustrating the modulated pseudo and desired carriers output by the digital to analog converter.
Figure 18:
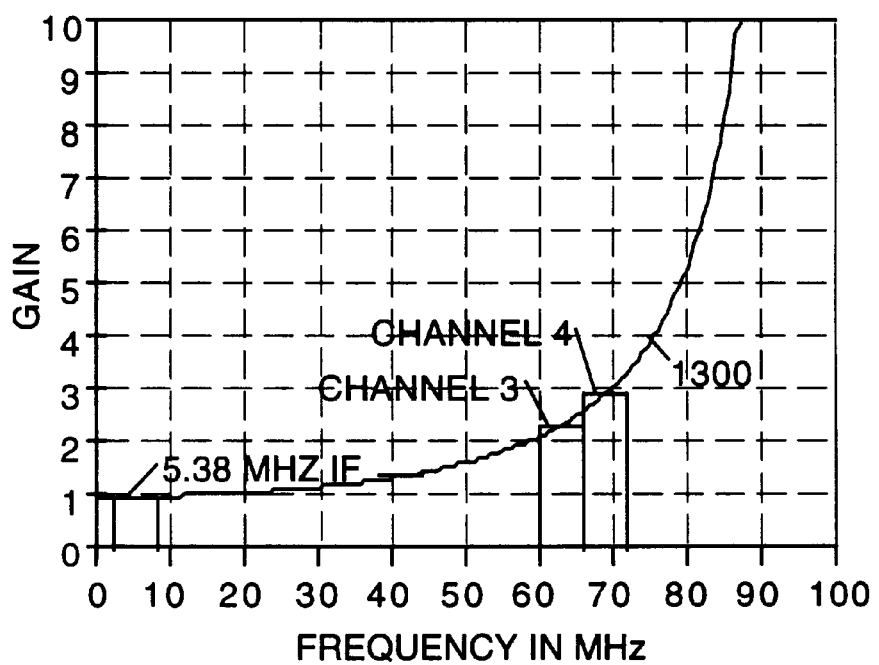
FIG. 18 is a graph showing a diagrammatic representation of the improvement in the desired carrier, effected by the digital sinx/x compensator shown in FIG. 2 and FIG. 19.

Reference is now made to FIG. 17, which is a graph of the normalized magnitude of a sinx/x expression over a frequency range that extends from −86.08 MHz to 86.08 MHz. Further shown in FIG. 17 is the variable effect of the sinx/x expression on magnitudes over the 6 MHz bandwidth centered on the respective frequencies of interest −69 MHz (Channel 4), −63 MHz (Channel 3), −23.08 MHz pseudo-carrier, −17.08 MHz pseudo-carrier, −5.38 MHz baseband, 5.38 MHz baseband, 17.08 MHz pseudo-carrier, 23.08 MHz pseudo-carrier, 63 MHz (Channel 3). Only the "slope" of the spectral shape of the sinx/x expression over the 6 MHz bandwidth of each of baseband requires a correction x'sinx tilt over their 6 MHz bandwidth in order to become flat (as shown in FIG. 18 by the intersection of x/sin x expression 1300 with the 6 MHz bandwidth of each of Channel 3, Channel 4 and 5.38 MHz IF baseband).

The proper x/sinx gain value for each of the 5.38, 63 and 69 MHz center frequencies is achieved by changing the DC reference magnitude employed by D/A converter 104. However, it is the operation by the digital sinx/x compensator, which occurs prior to the ±R and ±I complex sampled data streams of modulating a carrier, that provides the appropriate x/sinx tilt correction of the spectral-shape "slope" over a 6 MHz bandwidth at the sampling-frequency rate of these sampled data streams. Preferably, as shown in FIG. 2, sinx/x compensator 202 is located immediately before multi-scale modulator 204 and operates at a sampling-frequency rate of 10.76 MHz.

Sin x/x compensator 202, operating at a sampling-frequency rate of 10.76 MHz, is capable of performing either a simple, but approximate, linear slope x/sinx tilt correction of the 5.38, 63 or 69 MHz sin x/x spectral-shape over a 6 MHz bandwidth, or a more exact curve-fitting "slope" x/sinx tilt correction of any of these spectral-shapes.

The approximate approach is implemented with the following 3-tap filter, which operates on each of the ±R and ±I complex data input streams to sin x/x compensator 202 from VSB converter 200:

$$H_{\frac{x}{\sin(x)}}(z) = z^{-1} + \alpha \cdot j \cdot (1 - z^{-2})$$

This filter pre-tilts these ±R and ±I complex data input streams opposite to the "tilt" that the "sin(x)/x" will later be imposed by D/A converter 104. However, this approximate approach is not a true inverse and results in a parabolic distortion of the "corrected" band.

Because the actual slope shape of the sin x/x spectral-shape is non-linear, the approximate pre-tilt technique is sub-optimal, but is still effective. Specifically, the approximate pre-tilt technique results in distorting the resulting analog signal's root-raised cosine shape, but the television receiver's equalizer can compensate for this remaining impairment.

In the non-linear x/sin x pre-tilt technique, the x/sin(x) characteristic of D/A converter 104 in the channel to be compensated is decomposed into even and odd symmetric parts about its channel center. The even symmetric part, which is bow-shaped, is matched with a real coefficient even symmetric filter (about DC rather than channel center). The odd symmetric part equals $\{x/\sin(x)/((1-2\beta)+2\beta\cos(2\pi f/f_s))\}$ and effectively has a residual linear shape across the desired 6 MHz correction bandwidth at 4 or greater samples per symbol (which is more than satisfied by the 8 samples per symbol of the modulated carrier data stream applied to of D/A converter 104). This residual linear shaped odd symmetric part is matched with a complex coefficient odd anti-symmetric filter.

Preferably, filtering in the digital sinx/x compensator 202 by an even spectrally symmetric filter and an odd spectrally anti-symmetric filter in cascade occurs at a sampling-frequency rate of 10.76 MHz on the samples of 1 sample per symbol ±R and ±I complex DC centered data stream. At a symbol rate of 10.76 Msym/sec in a channel bandwidth of 6 MHz, compensation takes place over 55% of the unit circle in the z domain($z^{-1} = e^{-j\omega T_s}$, Ts=symbol spacing in time). Although the signal being corrected in the digital sinx/x compensator 202 belongs to a particular analog channel (e.g., TV channel 3 or 4), and is being pre-corrected earlier with one sample per symbol processing at a sampling-frequency rate of 10.76 MHz, the effect being cancelled thereby is caused later by D/A converter 104 being clocked at an 8 times higher sampling-frequency rate of 86.08 MHz.

Figure 19:
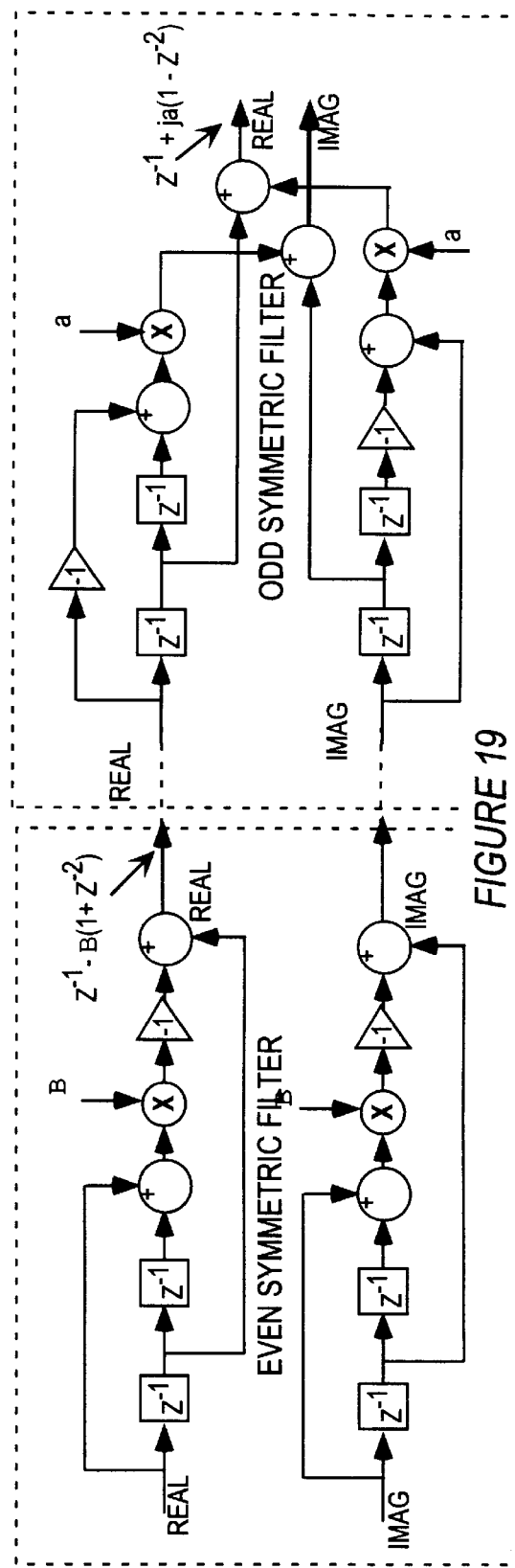
FIG. 19 shows the digital sinx/x compensator.

Exemplary circuitry of cascaded sinx/x compensating filters is illustrated in FIG. 19 which will be understood to be the cascade of two 3-tap transversal filters. Greater accuracy in sinx/x compensation may be achieved using filters with larger numbers of taps.

Further, digital sinx/x compensator 202 incorporates a multiplexer (not shown), similar in operation to above-described multiplexer 311 of VSB converter 200, to cause all computed x/sinx values that are real to be forwarded as the ±R data output stream therefrom and all computed x/sinx values that are imaginary to be forwarded as the ±I data output stream therefrom.

In a practical hardware implementation of digital VSB modulator 102, complement of 2 binary code was employed to effect all computations. Further, while all of the many above-described features of the present invention are described in the environment of a digital VSB modulator 102, it should be understood that a sub-set of one or more of these inventive features may find general utility in various types of apparatus that are different from digital VSB modulator 102, such as in QAM or OFDM modulators. Therefore, it is intended that the present invention be limited only by the scope of the appended claims.

What is claimed is:

1. Apparatus including a 1-sample-per-symbol pulse-code-modulation (PCM) DC-centered vestigial-sideband (VSB) converter, comprising:

first means responsive to an ongoing sampled data stream of 1-sample-per-symbol successive PCM symbol samples applied as an input thereto at a rate of a given sampling frequency for deriving, at said rate of said given sampling frequency, an ongoing DC-centered real (±R) sampled data output stream of 1-sample-persymbol sample values, wherein each sample value in any sequence of 4 successive 1-sample-per-symbol sample values of said sampled data output stream corresponds to a different one of the 4 quadrants of a cycle of an ongoing data-modulated cosine wave; and a bifurcated multiplexed N-tap root Nyquist FIR filter, responsive to said ±R sampled data output stream from said first means, for deriving, as complex outputs therefrom, respective DC-centered real (±R)and imaginary (±I) sampled data output streams of 1-sample-per-symbol sample values.

2. The apparatus defined in claim 1, wherein said first means comprises:

a modulator;

a source of said ongoing sampled data stream of 1-sample-per-symbol successive PCM symbol samples coupled to a modulating input of said modulator; and a source, of said ongoing sampled carrier stream occurring at a rate of said given sampling frequency, coupled to a carrier input of said modulator, wherein said sampled carrier stream is composed of a repeated 4-sample-sequence of 1, −1, −1, 1 sample values;

whereby said modulator derives said ±R sampled data-modulated output stream of 1-sample-per-symbol sample values which is coupled to an input to said filter.

3. The apparatus defined in claim 2, wherein said first means further comprises:

a second modulator having a carrier input coupled to said source, of said ongoing sampled carrier stream;

a source of a PCM pilot DC offset value coupled to a modulating input of said second modulator; and wherein a sampled ±R modulated output stream of sample values from said second modulator is coupled to a second input to said N-tap filter.

4. The apparatus defined in claim 2, wherein the number N of said N-tap filter is a given odd number and said N-tap filter comprises:

a first (N+1)/2-tap sub-filter composed of all the even-numbered taps, extending from even tap 0 to even tap N−1, of said N-tap filter;

a second (N−1)/2-tap sub-filter composed of all the odd-numbered taps, extending from odd tap 1 to odd tap N−2, of said N-tap filter;

wherein said ±R sampled data output stream of 1-sample-per-symbol sample values from said first means is coupled as input to all of said (N+1)/2-taps of said first sub-filter and, ±R of said (N−1)/2-taps of said second sub-filter; and delay circuitry, included in said first and second sub-filters, and a multiplexer toggled between first and second multiplex positions thereof for (1) directing a ±R sampled data output stream from said first sub-filter to said ±R sampled data output stream from said filter when said multiplexer occupies a first multiplex position, (2) directing a ±I sampled data output stream from said second sub-filter to said ±I sampled data output stream from said filter when said multiplexer occupies said first multiplex position, (3) directing a ±R sampled data output stream from said second sub-filter to said ±R sampled data output stream from said filter when said multiplexer occupies a second multiplex position, and (4) directing a ±I sampled data output stream from said first sub-filter to said ±I sampled data output stream from said filter when said multiplexer occupies said second multiplex position, wherein said delay means introduces a relative delay of 1 clock period between isochronously-occurring sample values of said sampled data output streams from said first and second sub-filters; and wherein isochronously-occurring sample values of said ±R and ±I sampled data output streams from said filter define the same symbol.

5. The apparatus defined in claim 4, wherein said N-tap filter is an input-weighted N-tap filter.

6. The apparatus defined in claim 5, wherein said input-weighted N-tap filter comprises a first set of 2-clock period delay latches (314), each of which is associated with a different one of even tap 2 to even tap N−1 of said first sub-filter;

a first set of summers (318), respective ones of which are coupled between respective ones of said first set of 2-clock period delay latches, and each of which is associated with a different one of even taps of said first sub-filter;

a first set of multipliers (312), each of which has an output coupled to a different one of said first set of summers of said first sub-filter, and has said ±R sampled data output stream from said first means applied as a multiplicand input thereto and a coefficient value applied as a multiplier input thereto;

a second set of 2-clock period delay latches, each of which is associated with a different one of odd tap 3 to odd tap N−2 of said second sub-filter;

a second set of summers, respective ones of which are coupled between respective ones of said second set of 2-clock period delay latches, and each of which is associated with a different one of odd taps of said second sub-filter;

a second set of multipliers, each of which has an output coupled to a different one of said second set of summers of said second sub-filter, and has said ±R sampled data output stream from said first means applied as a multiplicand input thereto and a coefficient value applied as a multiplier input thereto.

7. The apparatus defined in claim 6, wherein said delay means included in said first and second sub-filters comprise:

a 1-clock period delay latch in said first sub-filter for forwarding the sampled data output stream of sum sample values from said even tap 0 summer to a first input of said multiplexer; and 2-clock period delay means in said second sub-filter for forwarding the sampled data output stream of sum sample values from said odd tap 1 summer to a second input of said multiplexer.

8. The apparatus defined in claim 7, wherein:

said forwarding 2-clock period delay means in said second sub-filter comprises first and second serially-connected 1-clock period delay latches;

a summer having an input and output coupled between an output of a first of said serially-connected 1-clock period delay latches and an input to said second of said serially-connected 1-clock period delay latches in said second sub-filter, and having a second input for receiving a ±R sampled pilot output stream of sample values.

9. The apparatus defined in claim 8, wherein said first means further comprises:

a second modulator having a carrier input coupled to said source, of said ongoing sampled carrier stream;

a source of a PCM pilot DC offset value coupled to a modulating input of said second modulator; and wherein said ±R sampled pilot output stream of sample values is provided by said second modulator.

10. The apparatus defined in claim 4, wherein:

said given odd number of said N-tap filter is 55;

whereby said first sub-filter comprises 28 taps and said second sub-filter comprises 27 taps.

11. The apparatus defined in claim 1, wherein:

said given sampling frequency is substantially 10.76 MHz.

12. The apparatus defined in claim 1, wherein:

said ongoing sampled data stream of 1-sample-per-symbol successive PCM symbol samples applied as an input to said PCM to DC-centered VSB converter digitally defines ongoing given television data having a frequency bandwidth of substantially 6 MH; and said apparatus comprises a digital VSB modulator, which includes said PCM to DC-centered VSB converter, for applying a selected digital carrier frequency value modulated by said given television data as an input to a digital-to-analog (D/A) converter to derive an analog baseband television signal, an analog Channel 3 television signal or an analog Channel 4 television signal.

13. A method of converting one sample per symbol PCM data to one sample per symbol DC centered signal comprising;

providing said one sample per symbol PCM data at a given sample rate;

providing a carrier stream of a repeated 4-sample-sequence of sample values;

modulating said carrier stream with said one sample per symbol PCM data; and filtering modulated signal with a bifurcated multiplexed N-tap root Nyquist FIR filter, to produce a bifurcated complex output signal having respective DC-centered real (±R) and (±I) sampled data output streams of 1-sample-per-symbol sample.

14. The method set forth in claim 13 including the further steps of:

providing a PCM pilot DC offset value;

modulating said carrier stream with said PCM pilot DC offset value to generate a second modulated signal; and incorporating an ongoing sampled ±R modulated output stream of sample values from said second modulated signal as a second input to said N-tap root Nyquist FIR filter.

15. The method set forth in claim 13 wherein the step providing a carrier stream of a repeated 4-sample-sequence of sample values comprises providing sets of 1, −1, −1, 1 sample values.

* * * * *